Sept. 27, 1927.
R. BRADSTREET
GAUGE
Filed Dec. 22, 1922
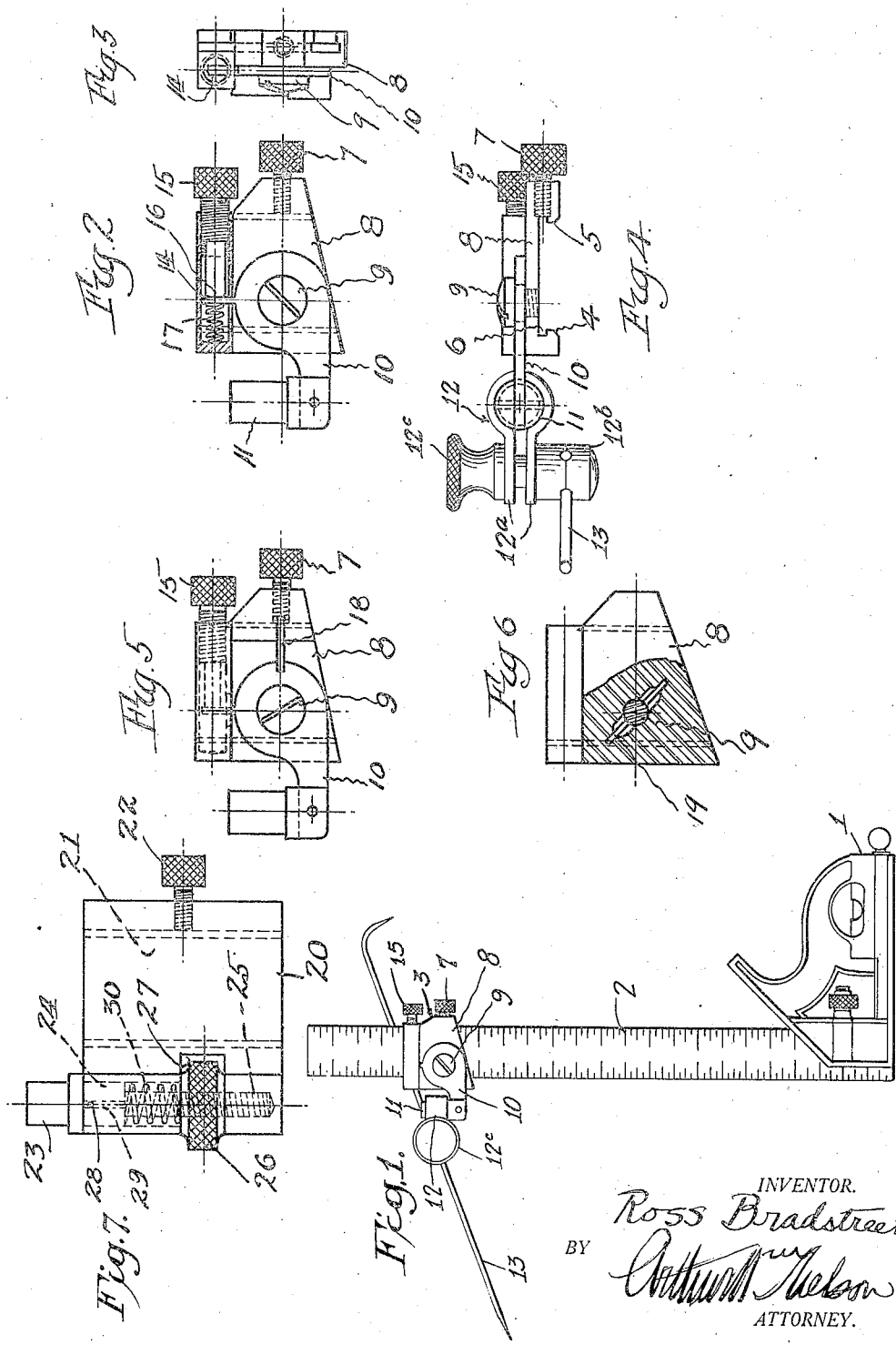
INVENTOR.
Ross Bradstreet
BY
ATTORNEY.

Patented Sept. 27, 1927.

1,643,404

UNITED STATES PATENT OFFICE.

ROSS BRADSTREET, OF ST. CHARLES, ILLINOIS.

GAUGE.

Application filed December 22, 1922. Serial No. 608,436.

My invention relates generally to improvements in gauges, but in some of its aspects relates more particularly to improvements in surface gauges.

The general object of my invention is to provide a surface gauge which can be very readily combined with a scale and square.

It is also an object of my invention to provide a gauge which can be quickly adjusted to desired position on the scale and whereby the scriber or pointer can be quickly, easily, and accurately brought into contact with the surface or object. In this connection I aim also to provide a construction whereby the scriber can be moved into place with one hand, preferably the left, so that the right hand will be free to adjust or position the work where such action is necessary.

A further object of my invention is to provide a construction of the above character in which practically all error due to lost motion shall be eliminated.

My invention consists generally in a gauge of the form, arrangement, construction and co-action of the various parts thereof whereby the above named objects, together with others that will appear hereinafter are attainable; and my invention will be more readily understood by reference to the accompanying drawings which illustrate what I consider, at the present time, to be the preferred embodiment thereof.

In said drawings:

Fig. 1 is a side elevation of a gauge embodying my invention, the same being in condition for work.

Fig. 2 is a side elevation or face view of the device which is adapted to slide upon the scale and to support a scriber.

Fig. 3 is an end view of the device shown in Fig. 2.

Fig. 4 is a bottom edge view of the device shown in Fig. 2.

Fig. 5 is a face view similar to Fig. 2, but illustrating a modified form of my invention.

Fig. 6 is a fragmentary sectional view of still another modified construction embodying my invention; and Fig. 7 is a face view illustrating another construction embodying my invention.

In machine shop practice a surface gauge is required from time to time. Such gauges as heretofore constructed have usually consisted of devices which could not be used for any other purpose. At the same time the construction has been such that more than one hand is necessary to manipulate the gauge and even then considerable time is required accurately to position the scriber or finder in contact with the work.

Part of the equipment of almost every machinist consists of a square and a scale and I aim to provide means whereby the scale and square can be quickly and easily converted into a surface gauge. Thus, in Fig. 1, 1 represents a typical square in which there is positioned a typical steel scale 2. I have designated a device which bears, as a whole, the reference character 3 and which is adapted to slide along the scale. To this end it is provided with overhanging ledge portions 4 and 5 Fig. 4, which form a slot or guideway 6 of a size adapted snugly to embrace the scale 2. For holding the device 3 at any desired position on the scale 2 I have provided a set screw 7 which is threaded in the block 8. Mounted for swinging movement on the block 8, as by means of a pivot screw 9, is an arm 10 which, at its outer end, is provided with an upstanding pin 11 and which serves as a support for the holder 12 in which the scriber 13 is mounted. The holder 12 includes a split extension 12$^a$ on one side of which is a two part clamping block 12$^b$ between the parts of which the scriber 13 is tightly secured by a thumb nut 12$^c$. The construction just described is such as to permit of a longitudinal adjustment of the scriber as well as its angular position with respect to the scale 2.

For the purpose of swinging the arm 10 it is provided with a finger-like extension 14 which is arranged in the path of a screw 15, the end portion 16 of the screw contacting one side of the finger 14. Upon the other side of the finger 14 there is positioned a spring 17 which constantly presses the finger 14 against the stem portion 16 of the screw 15. Thus, if the screw 15 is rotated in one direction, it will positively swing the arm 10 downwardly and if it is backed away the arm 10 will be swung upwardly by virtue of the spring 17. By this construction all lost motion in the screw is taken up and the arm, 10, can be quickly and easily swung in order to position the scriber as desired. It should be obvious that the screw 15 can be manipulated with one hand, thus leaving the other hand free to position or adjust the work as is often necessary.

The modified construction shown in Fig. 5 is similar to that already described and corresponding parts have been given corresponding reference characters. Instead of providing a coil spring, however, a flat spring 18 is provided which is fixed at one end in the block 8 and at the other end in the arm 10. The spring 18 broadly functions the same as the spring 17.

In the modification shown in Fig. 6 a flat spring 19 passes through the pivot screw 9, and obviously rotation thereof is resisted by the spring 19. In this construction the pivot pin 9 and the arm 10 are fixed to rotate or swing together.

In Fig. 7 I have illustrated a modification wherein there is provided a block 20 which is provided with a slot way 21 of a size adapted to slidably embrace the scale 2. 22 is a set screw for fixing the block upon the scale. Carried by the block 20 is a pivot pin or stud 23 which corresponds quite generally to the stud 11 referred to in the previous figures and is adapted to receive the device 12 in which the scriber 13 is mounted. Thus movement of the portion 23 would cause movement of the scriber. For the purpose of effecting such movement the portion 23 has a portion 24 which extends into the body of the block 20 and which is provided with an extension portion 25 that is screw threaded. Mounted on the screw threaded portion 25 is a nut 26 which is mounted in a slot 27 in the block 20, so that it may rotate but cannot move axially of the screw portion 25. The screw portion 25 is prevented from turning by means of a pin 28 which extends into a slot 29 provided in the face of the integral portion 24. Thus rotary movement of the nut 26 in one direction pushes the portion 23 outwardly and rotation in the opposite direction retracts it. Interposed between the portion 24 and the nut 26 is a helical spring 30 which takes up all lost motion of the screw and thereby enables the accurate operation of the device.

It will be observed that in all of the forms of my invention shown, the usual square and steel scale may be utilized to make the complete combination gauge.

The many advantages of my invention will be understood by those skilled in this art without further comment.

I claim:

1. A device of the class described embodying therein a block having an opening in one side thereof to operatively receive a supporting blade and having a tubular housing at one end, a screw threaded through one edge of the block for securing the same to the blade, means pivotally mounted on one side of the block and having an arm normally arranged in said housing and having a second arm extending beyond that edge of the block opposite the first mentioned edge and including a pin, a scriber holding means adapted to be secured upon said pin, an actuating screw in said housing parallel with said set screw and engaging said first mentioned arm extending into said housing, and a spring acting on said pivotally mounted means in opposition to said actuating screw.

2. A device of the kind described embodying therein a block adapted to be operatively engaged on a supporting blade and having a housing at one end, a set screw threaded through one edge of the block for locking it to said blade, a bell crank member pivoted on the side of said block and having one arm extending into said housing and having its other arm extending beyond the adjacent edge of said block and blade and provided with a pin, a scriber holding means adapted to be clamped to said pin, an actuating screw threaded into the housing above and parallel with said set screw and engaging with one side of said operative crank arm extending into said housing, and a spring in said mounting and engaging the opposite side of said bell crank arm.

In testimony whereof, I have hereunto set my hand, this 29th day of November, 1922.

ROSS BRADSTREET.